Sept. 29, 1959  R. H. ORR ET AL  2,906,505
PARKING LOT CONTROL SYSTEM
Filed Sept. 27, 1954  4 Sheets-Sheet 1
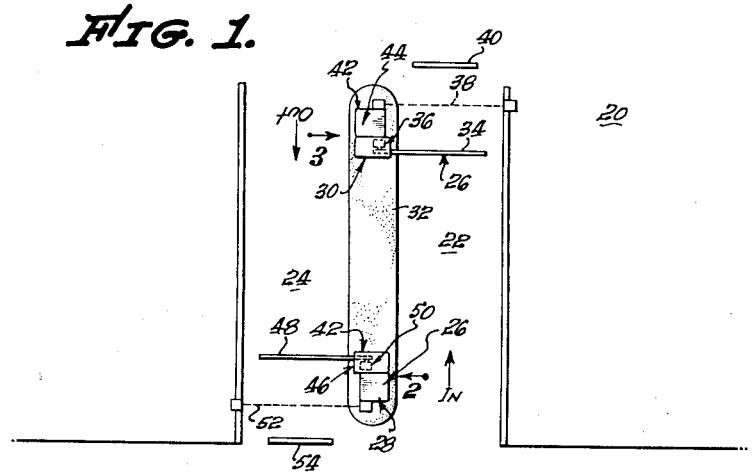
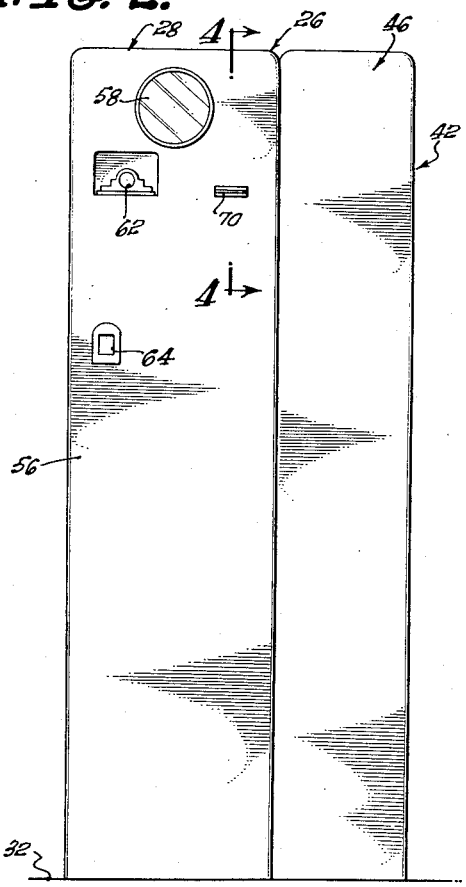
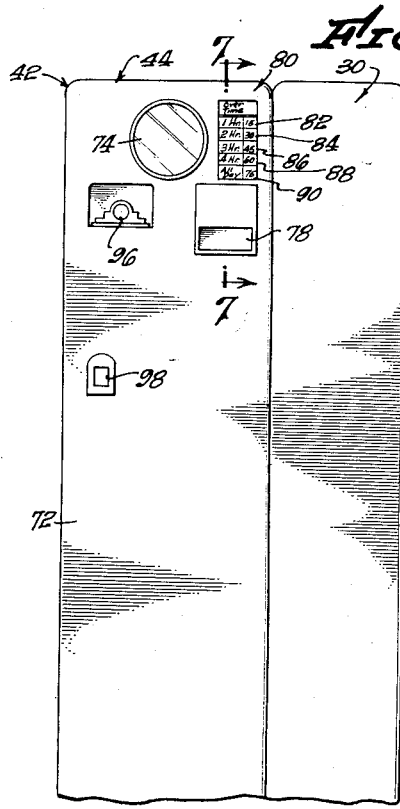
Robert H. Orr,
Edward Meripol,
  Inventors.
By Their Attorneys.
Harris, Kiech, Foster & Harris.

Sept. 29, 1959 R. H. ORR ET AL 2,906,505
PARKING LOT CONTROL SYSTEM
Filed Sept. 27, 1954 4 Sheets-Sheet 2

ROBERT H. ORR,
EDWARD MERIPOL,
INVENTORS.

By THEIR ATTORNEYS.
HARRIS, KIECH, FOSTER & HARRIS.

Sept. 29, 1959 R. H. ORR ET AL 2,906,505
PARKING LOT CONTROL SYSTEM
Filed Sept. 27, 1954 4 Sheets-Sheet 3

ROBERT H. ORR,
EDWARD MERIPOL,
INVENTORS.
BY THEIR ATTORNEYS.
HARRIS, KIECH, FOSTER & HARRIS.

Sept. 29, 1959 R. H. ORR ET AL 2,906,505
PARKING LOT CONTROL SYSTEM
Filed Sept. 27, 1954 4 Sheets-Sheet 4

ROBERT H. ORR,
EDWARD MERIPOL,
INVENTORS.
By THEIR ATTORNEYS.
HARRIS, KIECH, FOSTER & HARRIS.

United States Patent Office 2,906,505
Patented Sept. 29, 1959

2,906,505

PARKING LOT CONTROL SYSTEM

Robert H. Orr and Edward Meripol, Los Angeles, Calif., assignors, by direct and mesne assignments, of one-half to said Robert H. Orr and one-half to William R. Kallian Application September 27, 1954, Serial No. 458,332

13 Claims. (Cl. 256—1)

The present invention relates in general to an apparatus for extracting compensation for time consumption and, since the invention is particularly applicable to an apparatus for extracting compensation for time consumed in a particular designated area, the invention will be considered in such connection herein as a matter of convenience. More particularly, the invention contemplates an apparatus for controlling admission to and egress from a designated area and for extracting compensation for the time consumed within such area, the invention being considered herein as embodied in a control system for an automotive parking area, such as a lot or garage, as a matter of convenience since it is particularly applicable thereto. However, it will be understood that the invention as a whole is susceptible of various other applications and that various features thereof are susceptible of still other applications, all without departing from the spirit of the invention.

In general, the primary object of the invention is to provide a control system for an automotive parking lot, or other area, having as an essential component thereof a ticket which is keyed to time, i.e., a ticket which is provided with a time record thereon, it being understood that the term "ticket," as used herein, is intended to include any device on which a time record may be produced. As a matter of convenience, the ticket may be formed of pasteboard, or the like, and will be so considered herein, although it will be understood that the invention is not necessarily limited thereto.

Still more particularly, a primary object of the invention is to provide a control system which dispenses a ticket having thereon a record of the time of issuance, and which subsequently scans the time record on the ticket to determine the length of time consumed in the parking lot, or other area. Preferably, the control system extracts compensation, upon issuance of a ticket, for a base period of time, the control system requiring additional compensation if subsequent scanning of the ticket determines that the base period of time has been exceeded.

Another object of the invention is to provide a control system which includes a ticket dispenser which operates to issue a ticket having thereon a record of the base period of time upon receipt of compensation for such base period, the control system also having means for opening an entrance gate, or the like, for admission to the parking area upon receipt of compensation for the base period of time. Preferably, the control system includes coin-operated means for controlling the ticket dispenser and the entrance-gate-opening means, these elements of the control system being energized upon deposit in the coin-operated means of the compensation required for the base period of time.

Another object of the invention is to provide a control system which includes means for scanning the time record on the ticket to determine whether any compensation is due for the time consumed within the parking lot, or other area. In the particular embodiment of the invention hereinbefore outlined, the purpose of the scanning means is to determine whether any additional compensation is due for time consumed in the parking lot in excess of the base period of time. Thus, the scanning means may conveniently be referred to as a "ticket validator" since it determines whether the ticket is still "valid," i.e., effective to cover the time consumed, and, if the ticket is not still valid, it determines the amount of additional compensation required to make the ticket valid.

Another object is to provide means controlled by the ticket validator for preventing egress from the parking lot until the time record on the ticket has been scanned by the ticket validator and the compensation due determined by the ticket validator has been extracted, as by deposit of coins in a coin-operated means. Subsequently, the ticket validator energizes an exit-gate-opening means to permit egress from the parking lot, which is another object of the invention.

Thus, it will be seen that the control system of the invention issues a ticket and opens an entrance gate to provide admission to the parking lot, preferably upon deposit of coins representing compensation for a base period of time within the parking lot, and, subsequently, the control system scans the time record on the ticket and determines the compensation due, or the compensation due over and above the compensation previously extracted for the base period of time, before permitting egress from the parking lot by opening an exit gate, all of this being accomplished entirely automatically without any necessity for an attendant, which is an important feature of the invention.

Another object of the invention is to provide a ticket dispenser wherein the time-record-producing means includes two primary time-record-producing elements one of which is movable toward and away from the other to produce the time record on a ticket disposed therebetween, at least one of these elements preferably being rotatable so that the time record is produced along a circular orbit. However, other, noncircular orbits may be used. While record forms other than holes may be used, such as electrically conductive spots, or the like, the time-record-producing means preferably includes primary time-record-producing elements adapted to make a hole through the ticket to produce the time record, one of these elements being a rotatable punch and the other being a rotatable die rotated in synchronism with the punch. Preferably, the die and punch are rotated through one revolution in twenty-four hours, and the hole punched through the ticket preferably has an angular extent of substantially 15°, or 1/24 of the circular orbit, to provide a time record presenting a base period of time for consumption within the parking lot of one hour. Compensation for the one-hour base period is then extracted prior to dispensing of the ticket.

Another object is to provide a time-record-producing means which includes secondary time-record-producing elements at least one of which is rotatable one revolution every twelve hours to produce a record on the ticket of the time of day of issuance of the ticket, in addition to the time record hereinbefore discussed.

Another object is to provide a ticket dispenser wherein a single clock means drives the rotatable primary and secondary time-record-producing elements, the former through one revolution every twenty-four hours and the latter through one revolution every twelve hours.

Another object is to provide a ticket validator which includes rotatable scanning means adapted to follow the circular orbit on the ticket along which the time record is produced by the ticket dispenser, the scanning means being rotated in synchronism with the time-record-producing means.

Another object is to provide a scanning means which includes two contact means one carried by a rotor and including a plurality of contacts adapted to engage the other contact means, one of such contacts being insertable through the hole in the ticket into engagement with said other contact means. With this construction, if the contact whose position corresponded to the position of the hole in the ticket at the time of issuance of the ticket is still aligned with the hole in the ticket upon validation, this indicates that the base period of time has not been exceeded and no additional compensation is required to cause the control system to open the exit gate to permit egress from the parking lot. However, if a contact other than the one whose position corresponded to the position of the hole in the ticket at the time of issuance of the ticket is aligned with the hole in the ticket upon validation and thus engages said other contact means, this indicates that the base period of time has been exceeded and the control system requires additional compensation for the overtime before it will open the exit gate. In this connection, another object of the invention is to provide means for indicating the overtime compensation required. Preferably, the scanning means provides for indicating overtime charges for a limited number of one-hour overtime periods, an all day rate, or the like, being effective after such limited number of one-hour overtime periods.

It will be understood that a photoelectric scanning means could be used instead of the contact scanning means discussed above. Also, other scanning means could be used, depending on the record form.

Another object is to provide a control system having a net counter operated by the means for admission to and egress from the parking lot for keeping track of the number of automobiles in the lot, such net counter actuating a filled-to-capacity indicator when the parking lot is full.

Another object is to provide a coin lockout preventing the deposit of coins for admission to the parking lot in the event that the parking lot is filled to capacity and in the event that base-period compensation is required to gain entry to the lot.

Other objects include the provision of a control system having means for preventing the deposit of coins when the exit and entrance gates are in positions such as to prevent safe passage therethrough, having means for preventing the deposit of coins in the event of a current failure which incapacitates the system, having means for preventing closure of the entrance and exit gates on automobiles passing therethrough, having means for permitting egress from the lot by payment of a specified charge, such as an all day rate, in the event the ticket issued by the ticket dispenser is lost or mutilated, and the like.

It will be understood that while the control system of the invention has been discussed hereinbefore in connection with extracting compensation for a base period of one hour to gain admission to the parking lot, the invention contemplates extracting compensation for base periods of other lengths, or extracting compensation solely when seeking egress from the lot. Also, while a limited number of one-hour overtime periods has been mentioned, any desired number of overtime periods, or no overtime periods, may be utilized, and the lengths of the overtime periods may be varied as desired.

The foregoing objects, advantages and features of the present invention, together with various other objects, advantages and features thereof which will become apparent, may be attained with the exemplary embodiment of the invention which is illustrated in the accompanying drawings and which is described in detail hereinafter.

Referring to the drawings:

Fig. 1 is a plan view of the invention as embodied in a control system for an automotive parking lot or garage, and is exemplary only;

Figs. 2 and 3 are enlarged, side elevational views respectively taken as indicated by the arrows 2 and 3 of Fig. 1 and respectively illustrating elements of the means of admission to and means of egress from the parking lot;

Figure 8:
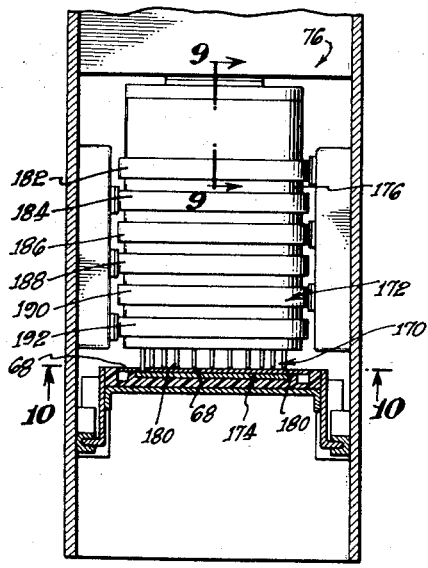
Fig. 8 is an enlarged sectional view taken along the arrowed line 8—8 of Fig. 7.
Figure 9:
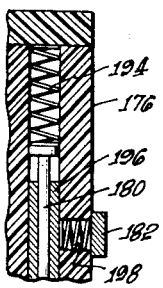
Figure 10:
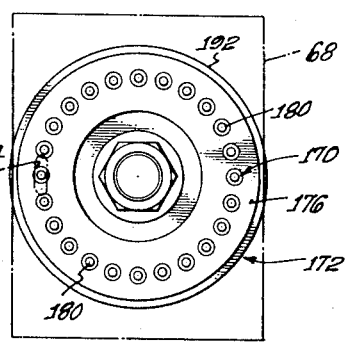
Figure 11:
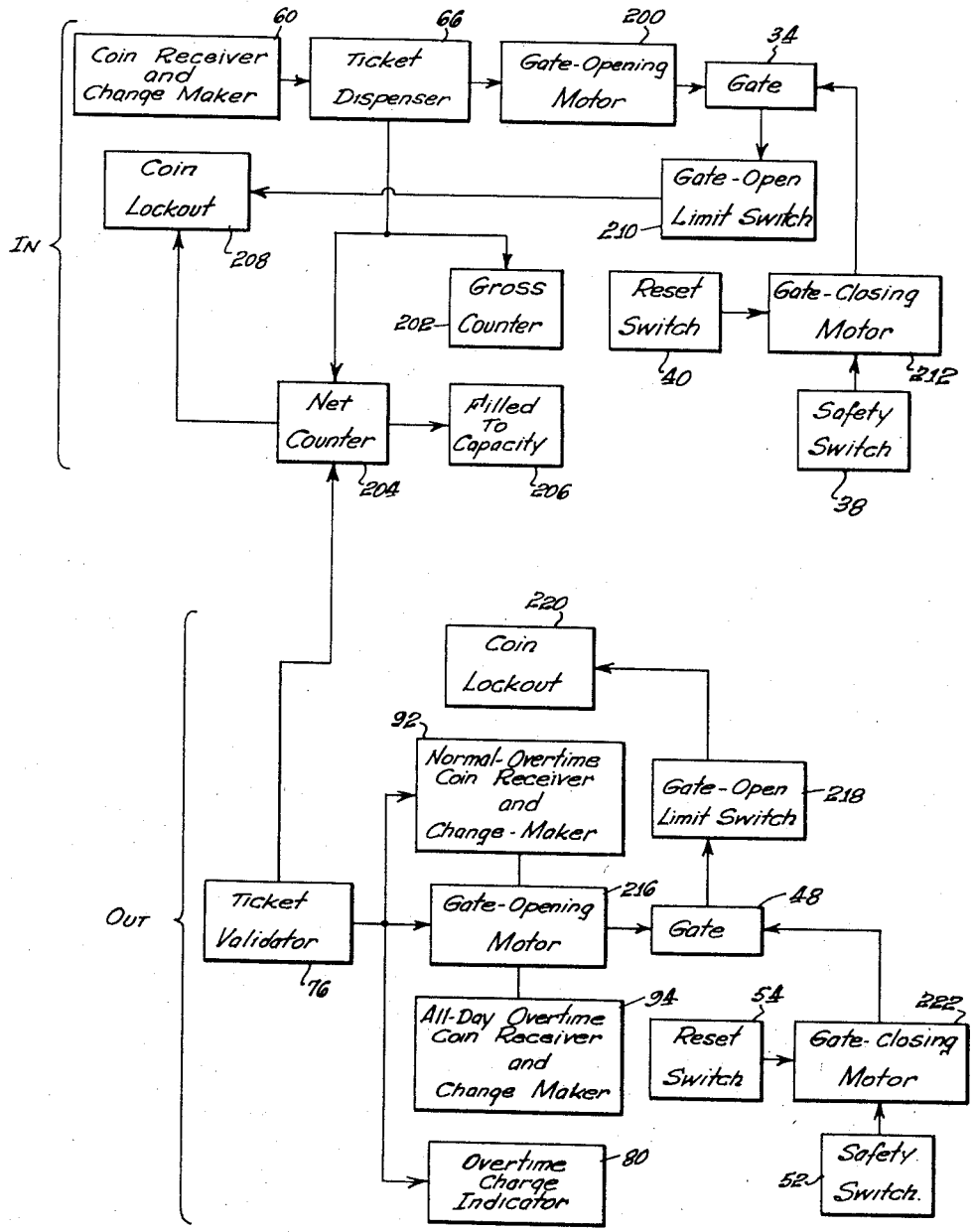

Figs. 9 and 10 are sectional views respectively taken along the arrowed lines 9—9 and 10—10 of Fig. 8, Fig. 9 being on an enlarged scale; and Fig. 11 is a highly simplified diagrammatic view illustrating the operation of the control system of the invention and generally illustrating or suggesting the electrical circuitry thereof.

Referring first to Fig. 1 of the drawings, the numeral 20 designates an area which will be regarded as an automobile parking lot or garage, admission to the lot being gained by way of an entrance or entrance driveway 22, and egress from the lot being gained by way of an exit or exit driveway 24. In the particular exemplary layout illustrated, the entrance and exit 22 and 24 are shown disposed side-by-side, but it will be understood that the entrance and exit may be widely separated, or that, in some instances, they may coincide. The control system of the invention includes means 26 for admission to the parking lot 20 by way of the entrance 22, the admission means including an apparatus 28 accessible from the driver's side of an automobile in the entrance 22, the apparatus 28 being located adjacent the inlet end of the entrance. The admission means 26 also includes an apparatus 30 adjacent the outlet end of the entrance 22, the apparatus 28 and the apparatus 30 being mounted on an island 32 separating the entrance 22 from the exit 24. The apparatus 30 includes an entrance gate 34 which normally prevents admission to the parking lot 20 by way of the entrance 22, this gate being movable to a retracted position, not shown, to permit admission to the parking lot. For example, the entrance gate 34 may swing from a horizontal position, wherein it blocks the entrance 22, to a vertical position, wherein it clears the entrance to admit an automobile, the gate 34 being moved between its extended and retracted positions by an actuating means 36. This actuating means preferably comprises a suitable motor means, preferably electrically operated, and may comprise either a reversible electric motor, or two independent electric motors, one for opening the gate 34, and the other for closing same. For convenience, two independent electric motors will be considered hereinafter. The admission means 26 also includes a safety switch 38 and a reset switch 40 which will be described in more detail hereinafter, the purpose of the safety switch 38 being to prevent closing of the entrance gate 34 while an automobile is in its path of closing movement, and the purpose of the reset switch 40 being to permit closing of the entrance gate 34 when its path of closing movement has been cleared by an automobile entering the parking lot 20 through the entrance 22. In the particular construction shown, the safety switch 38 is photoelectric in nature and the reset switch 40 is of the treadle type adapted to be actuated by an automobile passing thereover. Other constructions may be utilized, however.

The control system of the invention also includes means 42 for egress from the parking lot 20 by way of the exit 24, the egress means including an apparatus 44 on the island 32 adjacent the inlet end of the exit 24 and an apparatus 46 on the island adjacent the outlet end of the exit. The apparatus 46 includes an exit gate 48 operable by an actuating means 50 and controlled by a safety switch 52 and a reset switch 54, such elements corresponding to the identically named elements of the admission means 26 and having identical purposes.

Figure 5:
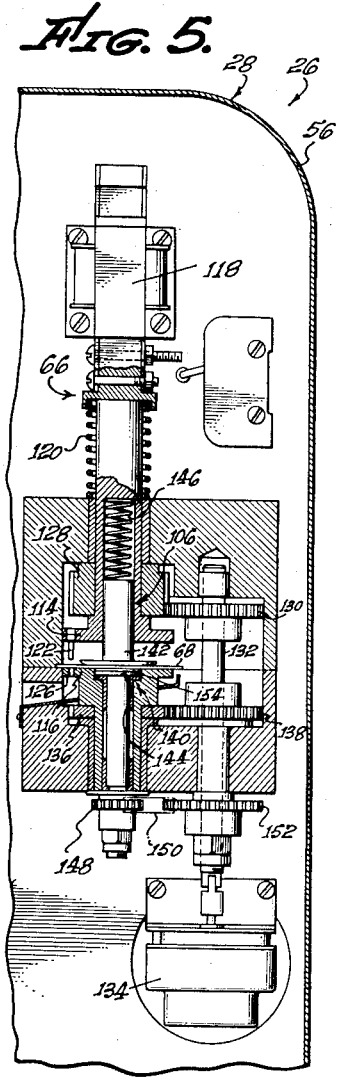
Fig. 5 is a sectional view of the ticket dispenser taken along the arrowed line 5—5 of Fig. 4.
Figure 6:
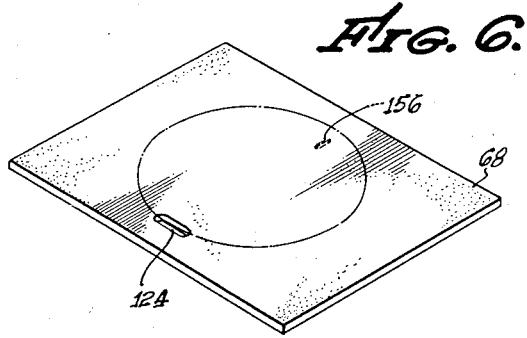
Fig. 6 is a perspective view of an exemplary ticket issued by the ticket dispenser.

Referring now to Fig. 2 of the drawings, the apparatus 28 of the admission means 26 includes a housing 56 carrying a clock 58 which indicates the time of day. The housing also contains a coin receiver and change maker 60, Fig. 11, which is of any suitable type so that it is unnecessary to show it in detail, coins being deposited in the coin receiver and change maker 60 through a coin slot 62, Fig. 2. Change and/or rejected coins are discharged into coin return chute 64. The apparatus 30 also include a ticket dispenser 66, Figs. 4, 5 and 11, which is located alongside the entrance driveway 22 ahead of the entrance gate 34 and which dispenses a ticket 68, Figs. 4 to 6, through a slot 70, Figs. 2 and 4, in the housing 56.

The apparatus 44 of the egress means 42 includes a housing 72 which also carries a clock 74 indicating the time of day. Within the housing 72 is a ticket validator 76, Figs. 7 to 11, having a carriage 78, Figs. 3, 7 and 8 in which a ticket to be validated is placed when the motorist desires egress from the parking lot, the ticket validator being located alongside the exit driveway 24 ahead of the exit gate 48. As hereinafter described in more detail, the ticket validator 76 controls an overtime charge indicator, the latter being, for example, a panel having sections 82, 84, 86, 88 and 90 which may be energized, as by light sources, not shown, behind such panel sections, to indicate the overtime charges for overtimes of one hour, two hours, three hours, four hours, and all day, these being exemplary only. The apparatus 44 also includes within the housing 72 a coin receiver and change maker of any suitable type which is not shown in detail, this coin receiver and change maker being illustrated diagrammatically in Fig. 11 of the drawings as comprising two parts 92 and 94, the former receiving compensation for overtime less than that requiring payment of an all day rate, and the latter receiving compensation based on an all day rate, as hereinafter described in more detail. On the exterior of the housing 72 of the apparatus 44 is a coin slot 96 into which coins for the coin receiver and change maker 92, 94 may be deposited, change and/or rejected coins being discharged into a coin return chute 98.

Figure 4:
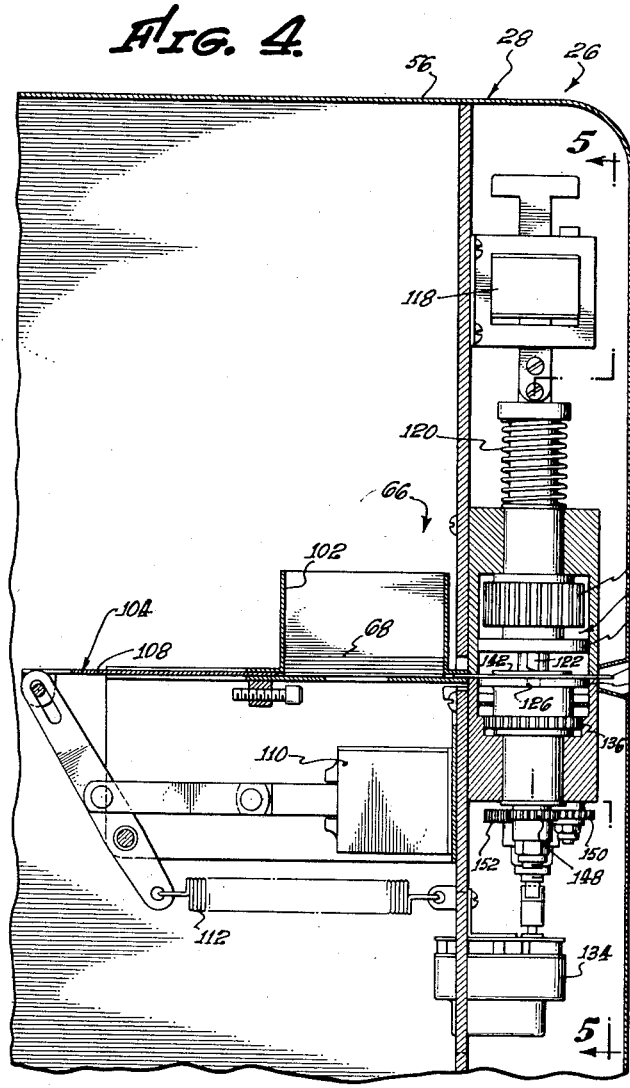
Fig. 4 is an enlarged sectional view of a ticket dispenser of the invention and is taken as indicated by the arrowed line 4—4 of Fig. 2.

Considering the ticket dispenser 66, it includes a receptacle 102 for a supply of tickets 68, and includes means 104 for displacing a ticket 68 from the receptacle 102 and positioning it in a time-record-producing means 106, each ticket being displaced into the means 106 by the means 104 and subsequently being dispensed through the slot 70 by another ticket being displaced into the means 106 by the means 104, as will be apparent from Fig. 4 of the drawings. The ticket displacing means 104 may be of any suitable nature, being shown as a plate 108 adapted to be advanced by a solenoid 110 upon energization thereof, and being adapted to be retracted by a spring 112.

Considering the time-record-producing means 106, it includes primary time-record-producing elements 114 and 116 adapted to receive a ticket 68 therebetween, the element 114 being movable toward and away from the element 116 to produce a time record on the ticket, and both being rotatable to produce the time record along a circular orbit. The element 114 is moved toward the element 116 by a solenoid 118 upon energization thereof, and is moved away from the element 116 by a retracting spring 120. In the particular construction illustrated, the element 114 carries a punch element 122 adapted to punch a hole 124 through the ticket 68 and insertable into a hole 126 in the element 116, the latter being a die element. In the particular construction illustrated, the punch element 122 has an angular extent relative to the axis of rotation of the elements 114 and 116 of substantially 15°, i.e., it has an angular extent of substantially 1/24 of a revolution. The elements 114 and 116 are rotated through one complete revolution every twenty-four hours so that the angular extent of the hole 124 punched in the ticket by the punch element 122 represents a period of time of substantially one hour. As discussed in more detail hereinafter, this one-hour period represents a base period of parking time within the parking lot 20 for which compensation is extracted in order to effect opening of the entrance gate 34 to gain admission to the parking lot, although it will be understood that a different base period, or no base period, may be utilized also.

Considering the manner in which the elements 114 and 116 are rotated, the element 114 carries an axially elongated gear 128 which is meshed with a gear 130 on a shaft 132 driven by a clock means or clock motor 134, the axial elongation of the gear 128 permitting movement of the element 114 toward and away from the element 116 without disengagement of the gears 128 and 130. The element 116 carries a gear 136 meshed with a gear 138 on a shaft 132, the gear ratios being so selected that the elements 114 and 116 rotate in synchronism through one revolution in twenty-four hours in the particular embodiment under consideration.

In addition to the time-record-producing means 106, the ticket dispenser 66 includes a secondary time-record-producing means 140 coaxial with the means 106 and including secondary time-record-producing elements 142 and 144. The element 142 is reciprocable in a bore in the element 114, being biased downwardly into engagement with the ticket 68 by a spring 146 and being rotatable relative to the element 114. The element 144 is journaled in the element 116 and carries a gear 148 meshed with an idler gear 150 which, in turn, is meshed with a gear 152 on the shaft 132 driven by the clock motor 134. The gear ratio between the shaft 132 and the element 144 is such that the latter rotates through one revolution each twelve hours, the element 144 having at the upper end thereof a punch element 154 adapted to make an indentation 156, Fig. 6, on the underside of the ticket 68. This indentation is made when the solenoid 118 is energized to move the element 114 toward the element 116, the element 142 simultaneously being moved toward the element 144 to produce the indentation 156 by virtue of the presence of the spring 146 between the elements 114 and 142. Since the punch element 154 makes one revolution every twelve hours, the indentation 156 provides an indication on the ticket of the time of day at which it was issued, a clock face, or the like, being printed on the ticket for cooperation with the indentation 156 if desired.

Thus, summarizing the operation of the ticket dispenser 66, it will be seen that, when the solenoid 118 is energized, a record of the base period of time, e.g., one hour, is punched and a record of the time of day is punched. Subsequently, when the solenoid 110 is energized, the punched ticket is dispensed through the ticket slot 70 and a fresh ticket is brought into position in the time-record-producing means 106.

Figure 7:
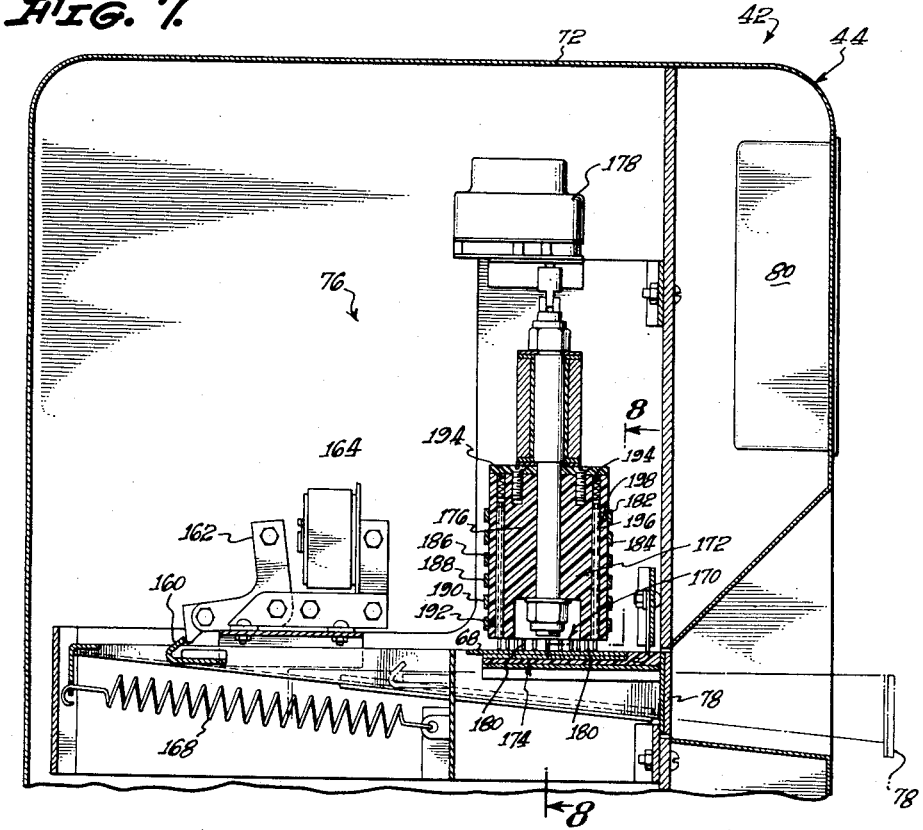
Fig. 7 is an enlarged sectional view of a ticket validator of the invention and is taken along the arrowed line 7—7 of Fig. 3.

Turning now to Fig. 7 to 10 of the drawings, the ticket validator 76 includes the hereinbefore-mentioned ticket carriage 78, which is movable between an extended position, shown in phantom in Fig. 7, and a retracted position, shown in solid lines in Fig. 7. When the carriage 78 is in its extended position, the ticket 68 to be validated may be placed therein, the carriage subsequently being pushed into its retracted position and being latched therein by a pivoted armature 162 of a solenoid 164, the armature 162 engaging a latch element 160 at the rear of the carriage. After payment of any compensation required by the ticket validator 76, as hereinafter described, the solenoid 164 is energized in any suitable manner to unlatch the carriage 78, whereupon the carriage is extended by a spring 168 in readiness to receive another ticket to be validated.

When the carriage 78 is in its retracted position, the ticket 68 thereon is aligned with a scanning means 170 comprising two contact means 172 and 174, the latter being a disc or plate in the particular construction illustrated. The contact means 172 is rotatable, comprising a rotor 176 driven by a clock means or clock motor 178 running in synchronism with the clock motor 134 of the ticket dispenser 66, as by being connected to the same alternating current power source. Thus, the rotor 176 makes one revolution every twenty-four hours, in the same manner as the time-record-producing means 106 of the dispenser. The contact means 172 includes a plurality of contacts 180 carried by the rotor 176, the contacts 180 being twenty-four in number in the particular construction illustrated to correspond to the twenty-four one-hour base periods recordable on the circular orbit on the ticket 68 by the time-record-producing means 106. These contacts are adapted to engage the contact means 174, and any contact 180 which is in alignment with the hole 124 in the ticket does engage the contact means 174, all others being insulated therefrom by the ticket. Thus, the contact means 172 scans the time record on the ticket to locate the hole 124 in the ticket and to determine, as will hereinafter be described, whether any time in excess of the base period has been consumed.

Considering the scanning action, the exterior of the rotor is provided with a series of slip rings 182, 184, 186, 188, 190 and 192 engage by suitable contacts leading to an external circuit which is not specifically shown. As shown in Fig. 9, each contact 180 is biased downwardly toward the contact means 174 by a compression spring 194, each contact being slidable in a conductive sleeve 196 and electrical contact between each sleeve 196 and one of the slip rings mentioned being established through a radial compression spring 198.

Keeping in mind that the rotor 176 of the scanning means 170 and the elements 114 and 116 of the time-record-producing means 106 rotate in synchronism, the angular position of one of the contacts 180 always corresponds to the angular position of the punch element 122, and this particular contact is electrically connected to the first slip ring in the series, e.g., the slip ring 182. Consequently, if, when a specific ticket 68 is scanned, the particular contact mentioned in the last sentence, i.e., the contact 180 which is electrically connected to the slip ring 182, is still in alignment with the hole 124 in the ticket, this indicates that the base period of time for which compensation was extracted upon admission to the parking lot 20 has not been exceeded so that no additional compensation is required. Successive contacts 180 in the series are connected to the slip rings 184, 186, 188 and 190, respectively; alignment of these contacts with the hole 124 in the ticket thus respectively indicating overtimes of one hour, two hours, three hours and four hours. In the particular construction illustrated, all of the remaining contacts 180 are connected to the last slip ring 192 in the series in a manner similar to that shown in Fig. 9 of the drawings, although additional slip rings may be employed if desired. For example, each contact 180 may be connected to a separate slip ring to charge for each hour of overtime independently. However, in the construction illustrated, it is contemplated that specific overtime charges will be made only for the first four hours of overtime, an all day rate prevailing thereafter.

By suitable circuitry, not specifically shown, the slip rings 184, 186, 188, 190 and 192 are respectively connected to the corresponding overtime charge indicator sections 82, 84, 86, 88 and 90. Thus, when the contact 180 connected to the slip ring 184 is aligned with the hole 124 in a ticket 68, the indicator section 82 is energized to indicate that compensation for an overtime period of one hour is due. Similarly, when the contact 180 connected to the slip ring 186 is in alignment with the hole 124 in a ticket, the indicator section 84 is energized to indicate the compensation due for an overtime period of two hours, and so forth. The detailed circuitry for the foregoing connections is not specifically shown in the drawings, but the general circuitry is outlined in Fig. 11 of the drawings, and will be considered hereinafter in considering the operation of the control system of the invention.

Turning now to Fig. 11 of the drawings in particular for a consideration of the over-all operation of the control system of the invention, a motorist desiring admission to the parking lot 20 drives into the entrance 22 and stops with the driver's window aligned with the apparatus 28. Assuming that the control system requires compensation for a base period of time of, for example, one hour, as hereinbefore discussed, the motorist deposits a coin or coins in the coin receiver and change maker 60 until coins of a total denomination at least equaling the charge for the base period have been deposited, any change being returned by way of the coin return chute 64. When a coin or coins the total denomination of which at least equals the charge for the base period have been deposited in the coin receiver and change maker 60, the latter, which may be of any suitable construction, energizes the ticket dispenser 66, which issues a ticket 68 through the ticket slot 70 with time records thereon in the manner hereinbefore discussed. As schematically shown in Fig. 11 of the drawings, the ticket dispenser 66 then energizes a gate opening motor 200, which opens the gate 34 to permit the motorist to drive into the parking lot 20, the motorist, of course, retaining the ticket 68 issued to him. The ticket dispenser 66 also energizes a gross counter 202 which maintains a cumulative total of the automobiles entering the parking lot 20, and energizes a net counter 204, the latter also being acted upon by the ticket validator 76 to maintain a count of the number of automobiles present in the parking lot 20 at all times. The net counter, which may be of any suitable type, actuates a filled-to-capacity indicator 206 when the total on the net counter equals the parking lot capacity. For example, the net counter 204 may close a switch in series with the indicator 206 under such conditions, the indicator being, for example, a panel illuminated by a light source therebehind when energized. The net counter, when the total thereon equals the capacity of the parking lot 20, also actuates a coin lockout 208 associated with the coin receiver and change maker 60 to prevent the deposit of coins by a motorist seeking admission to the lot, such coins being returned by the coin lockout 208 via the coin return chute 64. Preferably, the coin lockout 208 comprises some electrical means, not shown, which is de-energized by the net counter to effect the lockout function, the coin lockout normally being energized to permit the coin receiver and change maker 60 to accept coins. With this construction, in the event of a power failure incapacitating the entire control system of the invention, the coin lockout 208 will prevent acceptance of coins by the coin receiver and change maker 60, admission to the parking lot 20 being impossible under such circumstances.

The coin lockout 208 is also controlled by a limit switch 210 which is actuated by the gate 34 when it reaches its open position, thus preventing acceptance of coins by the coin receiver and change maker 60 until such time as the entrance gate has completed its cycle. This feature delays a second motorist long enough to prevent him from receiving a ticket and following a preceding motorist through while the gate 34 is on its way down, thereby preventing damage.

The gate 34 is also acted on by a gate-closing motor 212 which is controlled by the safety switch 38 and the reset switch 40. The gate-closing motor 212 cannot be energized until an automobile entering the parking lot 20 has cleared the entrance gate 34, the gate-closing motor 212 being energized by the reset switch 40 after the automobile has cleared the entrance gate and has cleared the safety switch 38 also.

As hereinbefore indicated, it will be understood that while separate gate opening and gate-closing motors 200 and 212 are shown, these may be replaced by a single, reversible motor, two motors having been shown for convenience.

When a motorist desires egress from the parking lot 20 he drives his automobile into the exit 24 and stops with the driver's window opposite the apparatus 44 of the egress means 42 and places his ticket 68 in the carriage 78 and pushes the carriage into its retracted position, wherein it is latched by the solenoid armature 162 until the solenoid 164 is energized to release the carriage after such motorist leaves the parking lot, the solenoid being energized for this purpose in any suitable manner, not specifically shown. The scanning means 170 scans the time record on the ticket 68, the circuitry in which the contact means 172 and 174 are disposed being energized in any suitable manner upon pushing of the carriage 78 into its retracted position. In the event that the scanning means 170 determines that the ticket is still valid, i.e., that the base period has not been exceeded, a motor 216 for opening the exit gate 48 is immediately energized. However, in the event that the scanning 170 determines that the ticket is no longer valid, i.e., that the base period has been exceeded, the overtime charge indicator 80 provides an appropriate indication. Assuming that the overtime does not exceed four hours in the particular construction illustrated, it is necessary to deposit coins in the coin receiver and change maker 92 by way of the coin slot 96, any change and/or rejected coins being returned by way of the coin return chute 98. When coins of a total denomination at least equaling the overtime charge have been inserted, the coin receiver and change maker 92 energizes the gate opening motor 216 to open the gate 48 to permit egress from the parking lot 20, this being accomplished by a suitable switching system, not shown. In the event that the overtime has exceeded four hours, the all day rate prevails with the particular construction illustrated, it then being necessary to insert coins having at least a total denomination equal to the all day charge. Such coins are received by the coin receiver and change maker 94, which energizes the gate opening motor 216 upon receipt of the proper compensation, any change being returned by way of the coin return chute 98. (Actually, the coin receiver and change maker 94 merely comprises elements added to the coin receiver and change maker 92, but the two are treated as separate elements herein for convenience.)

When the gate 48 is fully open, it operates a limit switch 218 which actuates coin lockout 220 to prevent acceptance of coins by the coin receivers and change makers 92 and 94 for the same reason that the gate-open limit switch 210 causes the coin lockout 208 to prevent acceptance of coins by the coin receiver and change maker 60. The gate 48 is closed after the motorist has left the parking lot 20 by a gate-closing motor 222, the gate-closing motor being controlled by the safety switch 52 and the reset switch 54 in the same manner and for the same purposes as the gate-closing motor 212 is controlled by the safety switch 38 and the reset switch 40.

It should be noted that the ticket validator 76 is connected to the net counter 204, the ticket validator causing the net counter to subtract one from its total each time a car leaves the parking lot 20, in substantially the same manner as the ticket dispenser 66 causes the net counter 204 to add one to its total each time a car enters the parking lot.

In the event that a motorist has lost his ticket, or has accidentally or deliberately mutilated his ticket so that it cannot be inserted into the carriage 78, the motorist may still gain egress from the parking lot 20 by paying the all day rate, the coin receiver and change maker 94, as shown in Fig. 11 of the drawings, independently controlling the gate-opening motor 216 so that this end may be attained.

For the sake of simplicity and clarity, Fig. 11 of the drawings, which has just been described, omits circuit details and details of conventional elements which are not essential to an understanding of the control system of the invention. For example, the coin receivers and change makers 60, 92 and 94, including the computers and switching systems normally incorporated in such devices, are all conventional elements well known in the art. Consequently, the details thereof have been omitted and their circuitry has been indicated only generally, the same being true of various other elements of the system.

It will be understood that various features may be added to the control system of the invention as disclosed to prevent abuse by unscrupulous motorists. For example, with the control system as disclosed, a motorist could park in the lot 20 all day and then avoid paying the all day rate by discarding the ticket he obtained upon admission to the lot and obtaining a new ticket from the ticket dispenser 66 merely by again paying the base rate, it being assumed that the all day rate exceeds twice the base period rate. However, such a defrauding attempt could be circumvented readily by placing in the entrance 22 a treadle-type switch, not shown, which would have to be actuated by the weight of an automobile thereon before a ticket could be obtained. Continuous parking in the lot for several days could be circumvented by providing for recording the date on the ticket and by providing for scanning the ticket as to date as well as time. Incidentally, it might be pointed out here that a second motorist could conceivably follow a preceding motorist entering the lot 20 very closely ad thus keep the entrance gate 34 in its open position long enough to gain admission to the lot without paying the base period rate. However, this device would be of no avail since the motorist would have no ticket to validate upon seeking egress and would be forced to pay the all day rate in order to gain egress, as hereinbefore indicated for cases of lost or mutilated tickets.

As hereinbefore pointed out, the coin lockouts 208 and 220 prevent acceptance of coins in the event of a power failure. However, in order to permit egress of cars from the parking lot in the event of a power failure, some means is preferably provided to permit opening of the exit gate 48 manually in the event of a power failure. This may be accomplished in various ways, such as, for example, by the insertion of a friction clutch, not shown, between the actuating means 50 for the exit gate 48 and the exit gate itself, such friction clutch being adapted to be manually slipped to open the exit gate.

Although we have disclosed an exemplary embodiment of the invention herein, it will be understood that we do not intend to be limited strictly thereto, but desire to be accorded the protection afforded by the full scope of the claims appended hereto.

We claim as our invention:

1. In an automatic time-vending apparatus requiring compensation for time consumed in a designated area having an entrance and an exit, the combination of: entrance and exit gates respectively controlling said entrance and said exit; a ticket; means for requiring compensation for a base period of time for consumption within said area, including means ahead of said entrance gate and operable on said ticket for producing on said ticket a record of said base period, and including means connected to said entrance gate for opening said entrance gate; and means for subsequently requiring compensation for any time consumed in said area in excess of said base period, including ticket scanning means ahead of said exit gate and operable on said ticket for scanning said record to determine whether said base period has been exceeded, and including means connected to said exit gate for opening said exit gate.

2. In a control system for an area having an entrance and an exit, the combination of: entrance and exit gates respectively controlling said entrance and said exit; a ticket; means for admission to said area, including means ahead of said entrance gate and operable on said ticket for producing a time record on said ticket and including means connected to said entrance gate for opening said entrance gate; and means for controlling egress from said area, including ticket scanning means ahead of said exit gate and operable on said ticket for scanning said time record, and including means connected to said exit gate for opening said exit gate.

3. In a control system for an area having an entrance and an exit, the combination of: entrance and exit gates respectively controlling said entrance and said exit; means connected to said entrance gate and including ticket dispensing means ahead of said entrance gate for dispensing a ticket having a time record thereon, for opening said entrance gate; and means connected to said exit gate, and including ticket scanning means ahead of said exit gate and operable on said ticket for scanning said time record to determine whether any compensation is due for time consumed within said area, for opening said exit gate upon receipt of such compensation.

4. In a control system for an area having an entrance and an exit, the combination of: entrance and exit gates respectively controlling said entrance and exit; means connected to said entrance gate and including ticket dispensing means ahead of said entrance gate for dispensing a ticket having a time record thereon, for opening said entrance gate; and means connected to said exit gate for subsequently opening said exit gate upon receipt of any compensation due for time consumed within said area, including ticket scanning means ahead of said exit gate and operable on said ticket for scanning said time record to determine whether any such compensation is due, and including means viewable from ahead of said exit gate for indicating any such compensation.

5. In a control system for an area having an entrance and an exit, the combination of: entrance and exit gates respectively controlling said entrance and exit; coin-operated means connected to said entrance gate, and including ticket dispensing means ahead of said entrance gate for dispensing a ticket having a record thereon of a base period of time, for opening said entrance gate upon receipt of coin compensation for said base period; and means connected to said exit gate, and including ticket scanning means ahead of said exit gate and operable on said ticket for scanning said record to determine whether said base period has been exceeded, for opening said exit gate.

6. In a control system for an area having an entrance and an exit, the combination of: entrance and exit gates respectively controlling said entrance and exit; coin-operated means connected to said entrance gate, and including ticket dispensing means ahead of said entrance gate for dispensing a ticket having a record thereon of a base period of time, for opening said entrance gate upon receipt of coin compensation for said base period; and coin-operated means ahead of said exit gate and connected to said exit gate for subsequently opening said exit gate upon receipt of any coin compensation due for time consumed in said area in excess of said base period; including ticket scanning means ahead of said exit gate and operable on said ticket for scanning said record to determine any coin compensation due for time consumed in said area in excess of said base period, and including means viewable from ahead of said exit gate for indicating such coin compensation.

7. In a control system for an area having an entrance and an exit, the combination of: entrance and exit gates respectively controlling said entrance and exit; means for admission to said area, including a ticket dispenser ahead of said entrance gate for dispensing a ticket and having means operable on said ticket for producing a time record on said ticket, and including means connected to said entrance gate for opening said entrance gate; and means for egress from said area, including a ticket scanner ahead of said exit gate having means operable on said ticket for scanning said time record on said ticket, and including means connected to said exit gate and connected to and controlled by said ticket scanner for opening said exit gate.

8. In a control system for an area having an entrance and an exit, the combination of: entrance and exit gates respectively controlling said entrance and exit; means for admission to said area, including a ticket dispenser ahead of said entrance gate for dispensing a ticket and having means operable on said ticket for producing a time record on said ticket, said means for admission to said area including means connected to said entrance gate and connected to said ticket dispenser for opening said entrance gate when said ticket is dispensed by said ticket dispenser; and means for egress from said area, including a ticket scanner ahead of said exit gate and operable on said ticket and connected to and controlling said exit gate for scanning said time record on said ticket.

9. A control system as defined in claim 7 wherein said time-record-producing means includes means for making a hole through said ticket, said ticket scanner including a pair of contact means one of which includes a plurality of contacts adapted to engage the other of said contact means, one of said contacts being insertable through said hole in said ticket into engagement with said other contact means.

10. A control system as defined in claim 9 wherein said hole-making means and said one contact means are rotatable, said control system including means for rotating said one contact means and said hole-making means in synchronism.

11. A control system as defined in claim 10 wherein said hole-making means includes a hole-making element having an angular extent about the axis of rotation of said hole-making means of substantially 15°, said means for rotating said hole-making means rotating same one revolution in twenty-four hours so that said angular extent of said hole-making element corresponds substantially to a one-hour period.

12. A control system as defined in claim 7 wherein said time-record-producing means and said time-record-scanning means are rotatable, said control system including means for rotating said time-record-producing means and said time-record-scanning means in synchronism.

13. A control system as defined in claim 12 wherein the means last defined comprises clock means for rotating said time-record-producing means and said time-record-scanning means one revolution in twenty-four hours.

References Cited in the file of this patent

UNITED STATES PATENTS

| Number | Name | Date |
|---|---|---|
| 328,045 | Maxson | Oct. 13, 1885 |
| 874,047 | Wilson | Dec. 17, 1907 |
| 1,231,140 | Dixon | June 26, 1917 |
| 1,406,066 | Odell | Feb. 7, 1922 |
| 1,872,782 | Messick et al. | Aug. 23, 1932 |
| 2,003,852 | Beattie | June 4, 1935 |
| 2,055,031 | Hutchings | Sept. 22, 1936 |
| 2,528,790 | Scherer | Nov. 7, 1950 |
| 2,591,448 | Lorenz | Apr. 1, 1952 |
| 2,659,470 | DuPont | Nov. 17, 1953 |
| 2,663,497 | Straus | Dec. 22, 1953 |
| 2,746,745 | Damon | May 22, 1956 |
| 2,783,865 | Cleave | Mar. 5, 1957 |
| 2,795,875 | Nutter et al. | June 18, 1957 |

UNITED STATES PATENT OFFICE
CERTIFICATE OF CORRECTION

Patent No. 2,906,505

September 29, 1959

Robert H. Orr et al.

It is hereby certified that error appears in the printed specification of the above numbered patent requiring correction and that the said Letters Patent should read as corrected below.

Column 5, line 14, before "coin" insert -- a --; line 15, for "include" read -- includes --; column 7, line 30, for "engage" read -- engaged --; column 9, line 26, before "170" insert -- means --; line 53, before "coin" insert -- a --; column 10, line 34, for "ad" read -- and --; column 11, line 16, after "gate" insert a comma; line 19, after "means" strike out the comma; line 28, after "gate" insert a comma.

Signed and sealed this 22nd day of March 1960.

(SEAL)
Attest:

KARL H. AXLINE
Attesting Officer

ROBERT C. WATSON
Commissioner of Patents